United States Patent [19]
Takagi et al.

[11] Patent Number: 4,872,730
[45] Date of Patent: Oct. 10, 1989

[54] BRAKING CONTROL APPARATUS FOR USE IN MOTOR VEHICLE

[75] Inventors: Kozi Takagi, Takahama; Noriyuki Ido, Aichi; Sadayuki Ohno; Hideaki Suzuki, both of Kariya; Yoshiaki Inoue; Yoshihisa Nomura, both of Toyota, all of Japan

[73] Assignees: Nippondenso Co., Ltd., Kariya; Toyota Jidosha Kabushiki Kaisha, Toyota, both of Japan

[21] Appl. No.: 259,583

[22] Filed: Oct. 18, 1988

[30] Foreign Application Priority Data

Oct. 19, 1987 [JP] Japan .................. 62-263536

[51] Int. Cl.$^4$ .................................... B60T 8/88
[52] U.S. Cl. ........................... 303/92; 303/119; 73/121
[58] Field of Search ............. 303/92, 119, DIGS. 1-4, 303/100, 93, 116, 111, 96, 98, 102, 68, 69; 73/121-132, 39; 307/10 R; 340/52 C, 52 B, ; 364/426.01, 426.02, 426.03

[56] References Cited

U.S. PATENT DOCUMENTS

| | | | |
|---|---|---|---|
| 3,852,613 | 12/1974 | Wienecke | 303/92 X |
| 3,866,980 | 2/1975 | Eisele et al. | 303/92 |
| 3,907,378 | 9/1975 | Leiber | 303/92 |
| 3,907,380 | 9/1975 | Fleischer et al. | 303/92 |
| 3,948,568 | 4/1976 | Leiber | 303/92 |
| 4,082,370 | 4/1978 | Leiber et al. | 303/92 |
| 4,085,979 | 4/1978 | Leiber et al. | 303/92 |
| 4,100,792 | 7/1978 | Leiber | 303/92 X |
| 4,192,180 | 3/1980 | Gerstenmeier et al. | 303/92 X |
| 4,252,014 | 2/1981 | Ruof | 73/129 |
| 4,320,506 | 3/1982 | Farazi et al. | 303/92 X |
| 4,484,784 | 11/1984 | Leiber | 303/92 |
| 4,520,663 | 6/1985 | Moore et al. | 73/129 |
| 4,611,859 | 9/1986 | Otsuki et al. | 303/100 |
| 4,662,687 | 5/1987 | Leiber | 303/92 X |
| 4,714,296 | 12/1987 | Imoto et al. | 303/110 X |
| 4,746,174 | 5/1988 | Buschmann | 303/110 |
| 4,771,387 | 9/1988 | Hexel et al. | 364/426.02 |
| 4,789,938 | 12/1988 | Maehata et al. | 364/426.02 |

FOREIGN PATENT DOCUMENTS 61-287852 12/1986 Japan .

Primary Examiner—Douglas C. Butler
Attorney, Agent, or Firm—Cushman, Darby & Cushman

[57] ABSTRACT

A braking control apparatus for use in a motor vehicle having at least one wheel comprising a master cylinder for generating a hydraulic pressure in response to a braking operation of a vehicle driver, an accumulator for accumulating a hydraulic pressure and at least one wheel braking cylinder for braking the wheel in accordance with a hydraulic pressure supplied thereinto. A passage system is provided so that the wheel braking cylinder is communicated therethrough with the master cylinder and the accumulator. In the passage system are provided first and second change-over valves for cutting off the pressure from the master cylinder, cutting off the pressure from the accumulator and a third control valve disposed between the wheel braking cylinder and the master cylinder or the accumulator for establishing and cutting off the communication therebetween. An control unit controls the operations of the first to third valves so as to, in response to cutting off the communication with the accumulator, establish the communication with the wheel braking cylinder, and then establish the communication with the master cylinder. This valve control prevents the high-pressure remaining in the passage system after the cutting-off of the communication with the accumulator from being rapidly applied to the master cylinder.

5 Claims, 6 Drawing Sheets

BRAKING CONTROL APPARATUS FOR USE IN MOTOR VEHICLE

BACKGROUND OF THE INVENTION

The present invention relates generally to a braking apparatus for use in motor vehicles, and more particularly to such a braking apparatus with a control system for controlling the operating pattern of pressure control valves provided between a wheel braking cylinder and a master cylinder or an accumulator.

Generally, a braking apparatus for use in a motor vehicle comprises a master cylinder for generating a hydraulic pressure in response to depression of a braking pedal of the motor vehicle, an accumulator for accumulating a hydraulic pressure to a predetermined value, and at least one wheel braking cylinder for applying a braking force to a wheel of the motor vehicle. The wheel braking cylinder is coupled through pressure control valves to the master cylinder and the accumulator to perform the braking control for the wheel. The control valves may be required, due to relating to the braking action of the motor vehicle, to be checked in terms of normal opening and closing operations at a predetermined timing before running start such as on start of the engine. At the time of this operation checking (so-called primary check), when the valve between the accumulator and the wheel cylinder is opened, the pressure in the accumulator is supplied to the wheel braking cylinder side. Thereafter, the communication between the accumulator and the wheel braking cylinder is cut off and the wheel braking cylinder is then communicated with the master cylinder. At this time, the high-pressure remaining in the passage system to the wheel braking cylinder is rapidly transmitted to the master cylinder and this rapid high-pressure transmission allows generation of noises and causes the vehicle drive to be subject to a strong kickback when depressing the braking pedal.

SUMMARY OF THE INVENTION

The present invention has been developed in order to remove the drawbacks inherent to the conventional braking apparatus.

It is therefore an object of the present invention to provide a braking apparatus which is capable of appropriately controlling the pressure control valves so as not to allow the noise generation and cause the kickback occurrance.

A braking control apparatus according to the present invention includes master cylinder means for generating a hydraulic pressure in response to a braking operation of a driver of the motor vehicle, accumulator means for accumulating a hydraulic pressure, and wheel braking cylinder means for braking a vehicle wheel in accordance with a hydraulic pressure supplied thereinto. Passage means is disposed in common between the wheel braking cylinder means and the master cylinder means or the accumulator means so that the wheel braking cylinder means is communicated through the passage means with the master cylinder means or the accumulator means. In the passage means, first valve means is provided between the master cylinder means and the passage means for cutting off and establishing the communication therebetween, second valve means is provided between the passage means and the accumulator means for cutting off and establishing the communication therebetween, and third valve means is provided between the passage means and the wheel braking cylinder means for establishing and cutting off the communication therebetween. Also included in the braking control apparatus is control means for controlling the operations of the first to third valve means so as to, in response to cutting off the communication between the accumulator means and the passage means, establish the communication between the passage means and the wheel braking cylinder means, and establish the communication between the master cylinder and the passage means after the communication between the passage means and the wheel braking cylinder means.

The opening operation of the third valve means after cutting-off operation of the second valve means causes the high-pressure remaining in the passage means to be released toward the wheel braking cylinder means side so as to be lowered thereby, resulting in prevention of the occurrence of noises and kickback due to the final opening operation of the first valve means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
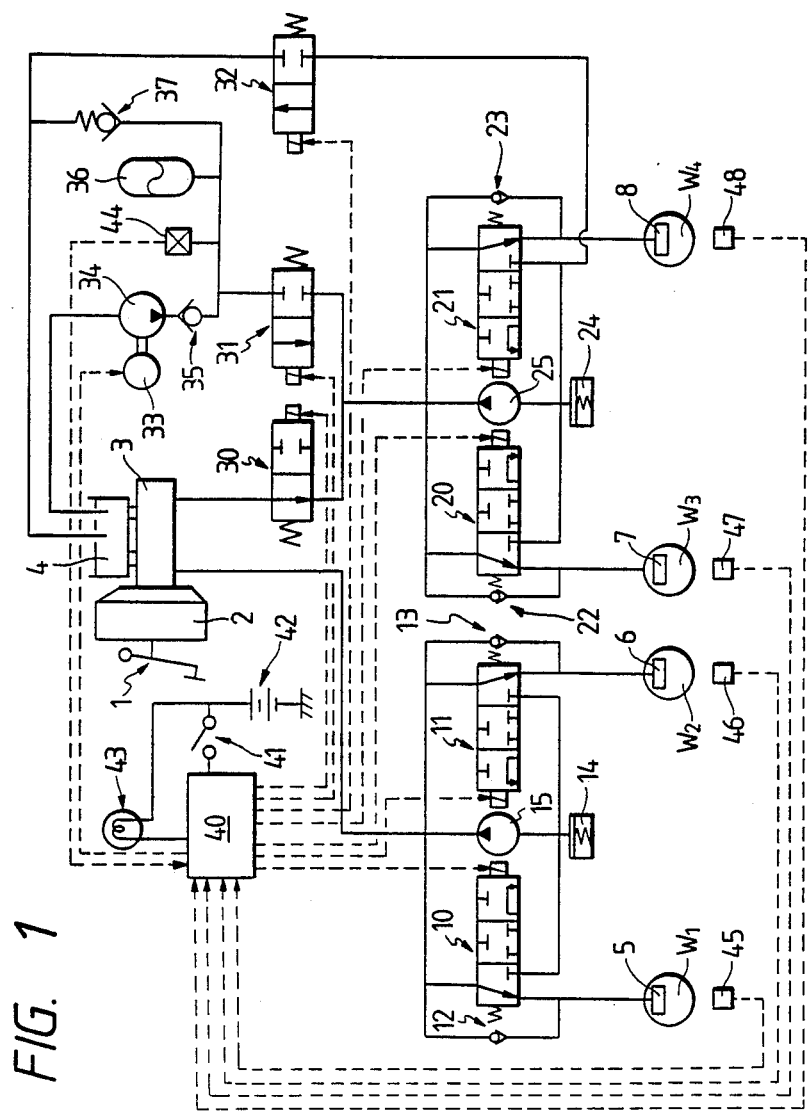
FIG. 1 is an arrangement diagram showing a braking control apparatus according to the present invention.

Referring now to FIG. 1 which shows a braking control apparatus of a motor vehicle which is presently in the normal state, the braking control system including an anti-skid control function for preventing wheel locking on braking operation and a traction control function for preventing excessive wheel slipping on acceleration. In FIG. 1, a braking pedal 1 is coupled through a vacuum booster 2 to a master cylinder 3 so that in response to depression of the braking pedal 1 a high hydraulic pressure corresponding to the magnifying action of the vacuum booster 2 is output toward wheel braking cylinders 5, 6 for braking non-driven wheels W1, W2 and wheel braking cylinders 7, 8 for braking driven wheels W3, W4. Numeral 4 represents a reservoir for storing the braking liquid. Between the master cylinder 3 and the non-driven wheels W1, W2 is provided a first braking pressure control system for adjusting the braking presures to be applied to the non-driven wheels W1, W2 on anti-skid control operation, the first braking pressure control system including solenoid-operated control valves 10, 11, check valves 12, 13, a damper 14 and a motor-driven pump 15. Each of the control valves 10, 11 is adapted to be switched to take a pressure-increasing mode in which each of the wheel braking cylinders 5, 6 is communicated with the master cylinder 3 and the discharge port of the pump 15, a pressure-decreasing mode in which each of the wheel braking cylinders 5, 6 is communicated with the damper 14 or a pressure-maintaining mode in which all the communication therebetween are cut off. Similarly, between the master cylinder 3 and the wheel braking cylinders 7, 8 for the driven wheels W3, W4 are provided a second braking pressure control system for anti-skid control comprising solenoid-operated control valves 20, 21, check valves 22, 23, a damper 24 and a motor-driven pump 25. The control valves 20, 21, as well as the above-mentioned control valves 10, 11, perform the switching operations among pressure-increasing modes, pressure-decreasing modes and pressure-maintaining modes. Furthermore, the control valves 20, 21 are operated on execution of the traction control.

Also included in the braking control apparatus of this embodiment is a third braking pressure control system for the traction control which comprises first to third change-over valves 30, 31, 32, an electric motor 33, a motor-driven pump 34, a check valve 35, an accumulator 36 and a relief valve. The first change-over valve 30 is provided between the master cylinder 3 and the control valves 20, 21 and further between the master cylinder 3 and the accumulator 36 so as to establish and shut off the communications therebetween. The second change-over valve 31 is at one end portion coupled to the pump 34 and the accumulator 36 and at the other end portion coupled to a passage provided between the first change-over valve 30 and the control valves 20, 21. The third change-over valve 32 is at one end portion connected to the damper 24 and at the other end connected to the reservoir 4. In response to drive of the motor 33, the pump 34 is operated so as to intake or suck the braking liquid from the reservoir 4 and discharge through the check valve 35 the braking liquid which is high-pressurized up to a given value. The accumulator 36 stores the high-pressure braking liquid from the pump 34 as it is, and the relief valve 37 is opened when the discharge pressure of the pump 34 or the accumulated pressure in the accumulator 36 exceeds a predetermined pressure value so as to return a portion of the braking liquid to the reservoir 4, thereby resulting in determining the maximum value of the braking liquid pressure.

Illustrated at numeral 40 is an electronic control unit (ECU) for controlling the braking pressure control systems on the basis of various input data, the electronic control unit 40 includes a microcomputer comprising a central control unit (CPU), a read-only memory (ROM), a random access memory (RAM), an input-/output port and so on. The electronic control unit 40 is powered through an ignition switch 41 of the motor vehicle by means of a power source 42 and further coupled to a lamp 43 for indicating a failure, a pressure switch 44 for detecting the discharge pressure of the pump 34 and the pressure in the accumulator 46 and wheel speed sensors 45 to 48 for detecting the wheel speeds of the respective wheels W1 through W4.

Figure 2:
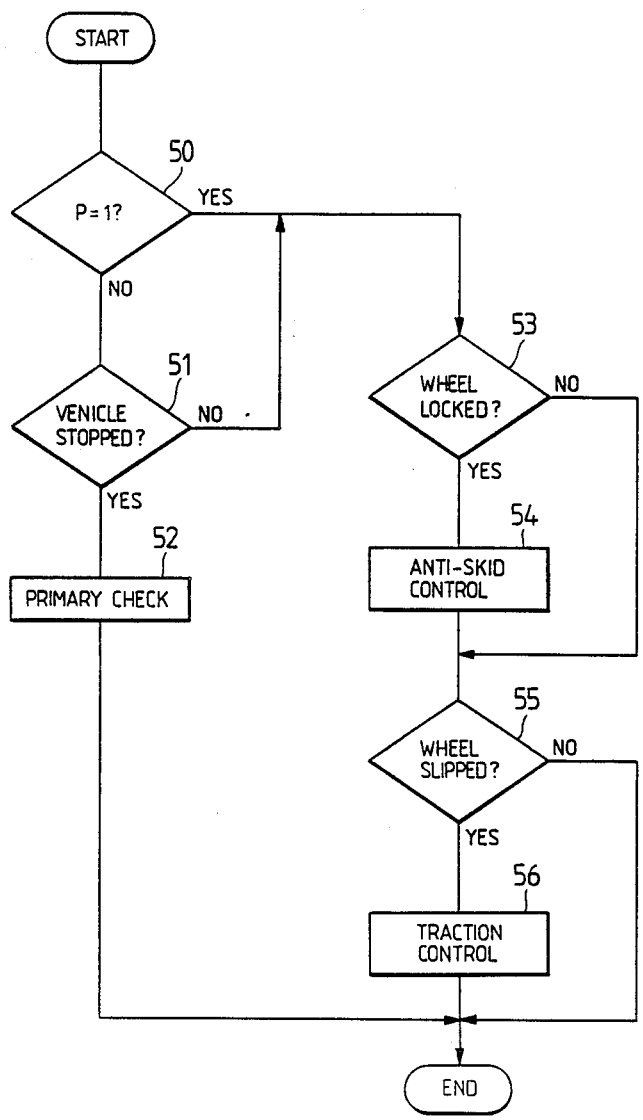
FIGS. 2 and 3 are flow charts for describing the operations executed by an electronic control unit of the braking control apparatus.
Figure 3:
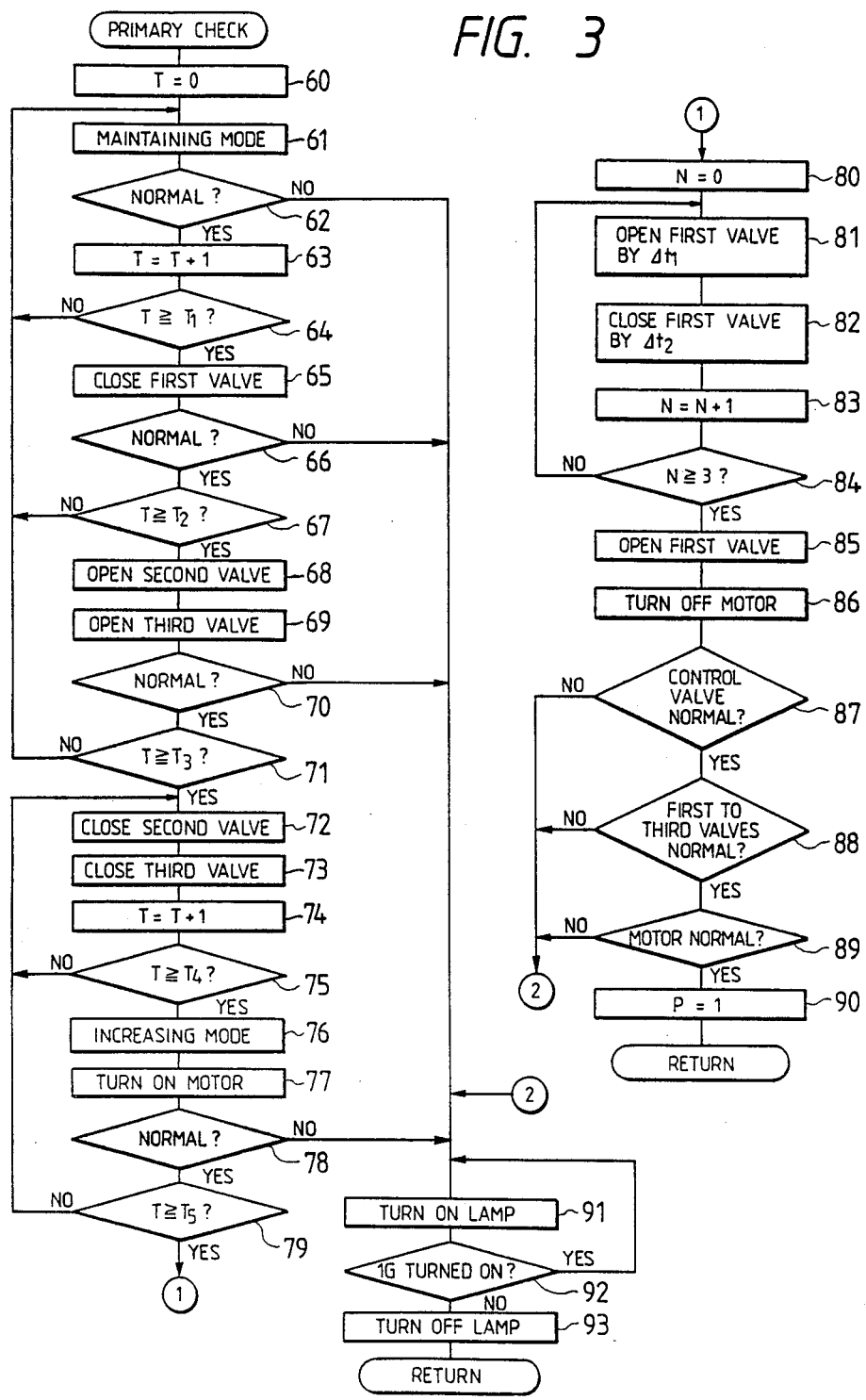
Figure 4:
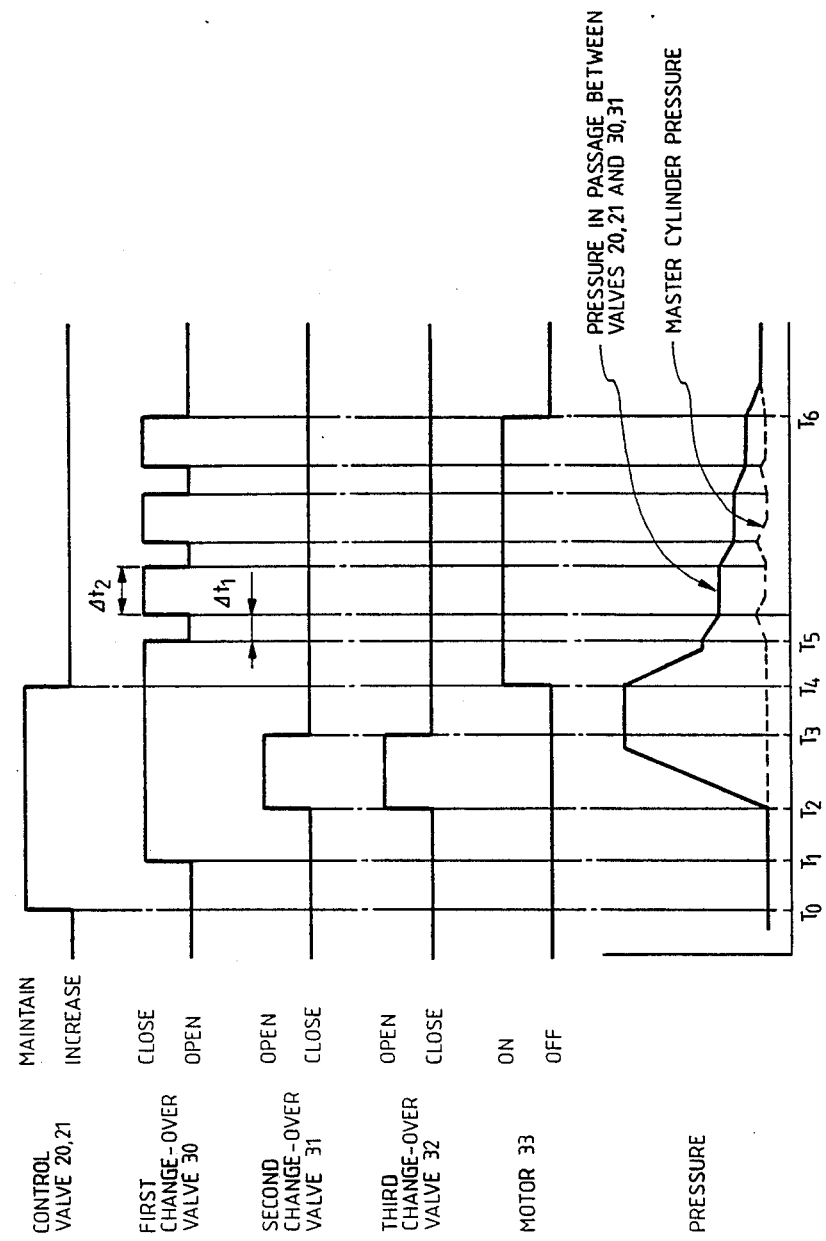
FIG. 4 is a timing chart for a better understanding of the FIG. 3 operation made by the electronic control unit.

Operation of the braking control apparatus will be described hereinbelow with reference to further FIGS. 2 to 4, FIGS. 2 and 3 showing the processes executed by the microcomputer of the electronic control unit 40 and FIG. 4 being a timing chart for describing a primary check of this embodiment. In response to turning-on of the ignition switch 41, the electronic control unit 40 starts the control shown in FIG. 2. The operational flow initially enters into a step 50 to check whether a primary flag P is "1" indicating completion of the primary check. Since $P=1$ in the initial stage immediately after the turning-on of the ignition switch 41, the decision of the step 50 is negative and control advances to a decision step 51 to check the vehicle state. If the motor vehicle is in the stopped state, control further advances to a step 52 to perform the primary check process as shown in FIG. 3 which will be described hereinafter.

On the other hand, in response to the completion of the primary check, the answer of the step 50 becomes affirmative and therefore control goes to a step 53 in order to check whether the wheel has a tendency to be locked. If so in the step 53, a step 54 follows to perform the anti-skid control of the wheel. If the decision of the step 53 is "NO" or after the termination of the process in the step 54, control proceeds to a step 55 to check occurrence of acceleration slipping of the driven wheels W3, W4. If the acceleration slipping occurs, control goes to a step 56 in order to perform the traction control.

A description of the primary check will be made hereinbelow with reference to FIG. 3. The primary check control starts with a step 60 to set the value T of a first counter to zero, followed by a step 61 to set the drive-wheel side control valves 20, 21 to the pressure-maintaining mode. A subsequent step 62 is provided in order to check whether the control valves 20, 21 are normal. If normal, control goes to a step 63 in which the value of the first counter is incremented as $T=T+1$ and further goes to a step 64 in order to check whether the counter value T becomes over a predetermined value T1. If the decision of the step 64 is negative, the control flow returns to the step 61. On the other hand, if the answer of the step 64 becomes affirmative, a step 65 follows to open the first change-over valve 30 so as to cut off the communication between the master cylinder 3 and the wheel braking cylinders 7, 8, followed by a step 66 to check whether the first change-over valve 30 is normal or not. If normal, control goes to a step 67 so as to check whether the value T of the first counter is over a predetermined value T2. If the answer of the step 67 is negative, the operational flow returns to the step 61.

On the other hand, the decision of the step 67 becomes "YES", a step 68 follows to open the second change-over valve 31 so as to establish the communication between the accumulator 36 and the wheel braking cylinders 7, 8. Thereafter, a step 69 is executed in order to open the third change-over valve 32, followed by a step 70 to check whether the second and third change-over valves 31, 32 are normal or not. If both the change-over valves 31, 32 are normal, control goes to a step 71 in order to check whether the value T of the first counter is above a predetermined value T3. If not, the operational flow returns to the step 61. If the decision of the step 71 is affirmative, a step 72 follows to close the second change-over valve 31 and further to a step 73 to close the third change-over valve 32 and still further to a step 74 to increment the value of the first counter as $T=T+1$. Control goes to a step 75 to check whether the value T of the first counter exceeds a predetermined value T4. If not, the operational flow returns to the step 72. Whereas if so, a step 76 is executed to set the control valves 20, 21 to the pressure-increasing mode, i.e., cause the control valves 20, 21 to be opened to establish the communication toward the wheel braking cylinders 7, 8, followed by a step 77 to start the motor 33 and further followed by a step 78 to check whether the motor 33 is normal or not. If the normal decision is made in the step 78, a step 79 follows so as to check whether the value T of the first counter is above a predetermined value T5. If the decision of the step 79 is "NO", control returns to the step 72.

On the other hand, if the answer of the step 79 becomes "YES", a step 80 is executed in order to set the value N of a second counter to zero, followed by a step 81 to open the first change-over valve 30 only for Δt1 (for example, 10 ms) and further followed by a step 82 to close the first change-over valve 30 only for Δt2 (for example, 20 ms). Thereafter, control goes to a step 83 to increment the value N of the second counter as N=N+1, followed by a step 84 to check whether the value N of the second counter is greater than 3. If not, control returns to the step 81. Whereas, if the decision of the step 84 is "YES", a step 85 is executed in order to open the first change-over valve 30, followed by a step 86 to stop the motor 33. A step 87 is then executed so as to check whether the control valves 20, 21 are normal. If normal, control exceeds to a step 88 to check whether the first to third change-over valves 30 to 32 are normal. If all the change-over valves 30 to 32 are normal, a step 89 follows to check whether the motor 33 is normal or not. If normal, control goes to a step 90 to set the primary flag P to "1".

Here, the decisions in the steps 62, 66 and 70 are made on the basis of the energizing states of the valve solenoids, that is, the normal decisions are given if the solenid energizing states are normal. In the steps 87, 88 the normal decisions are made when in the deenergized states. Furthermore, in the step 78, the normal decision is made when the motor 33 is in the energized state, and in the step 89 the normal decision is made when the motor 33 is in the deenergized state. If at least one of the decisions in the steps 62, 66, 70, 78, 87, 88 and 89 becomes negative, the operational flow goes to a step 91 to turn on the lamp 43 and then to a step 92 to check whether the ignition switch 41 is in the ON-state. If so, control goes from the step 92 to the step 91. If not, a step 93 follows to turn off the lamp 43.

A further description will be given in terms of the operation patterns of the respective valves and the pressure characteristics on the above-described primary check processes with reference to FIG. 4. In FIG. 4, in response to the first change-over valve 30 being closed at time T1, the communications between the master cylinder 3 and the wheel braking cylinders 7, 8 and between the master cylinder 3 and the accumulator 36 are cut off. Thereafter, at time T2 of the time period (T1 to T5) that the first change-over valve 30 is in the closed state, the second change-over valve 31 is opened. In the opening of the second change-over valve 31, the high-pressure braking liquid in the accumulator 36 is supplied to the wheel braking cylinder 7, 7 side passages so that the pressure in the passage system between the first and second change-over valves 30, 31 and the control valves 20, 21 is increased. Subsequently, the second change-over valve 31 is closed at time T3 and then the first change-over valve 30 is open/close-operated three times by the duty control during times T5 and T6. Here, the valve-opening time is Δt1 and the valve-closing time is Δt2. With the opening and closing operation of the first change-over valve 30, the high-pressure braking liquid in the passage system is gradually released to the master cylinder 3 side whereby it is possible to reduce the operation noises and the kickback.

Furthermore, during T0 to T4 including T2 to T3 for which the second change-over valve 31 is opened, the control valves 20, 21 are once switched to take the pressure-maintaining mode and further returned to the pressure-increasing mode at time T4 before the duty control of the first change-over valve 30 is started (T5). Thus, during T2 to T3, the high-pressure braking liquid from the accumulator 36 is applied to only the passage system but not supplied to the wheel braking cylinders 7, 8. In addition, because at T4 the control valves 20, 21 are returned to the pressure-increased mode, the high-pressure braking liquid in the passage system flows toward the lower-pressure wheel braking cylinder 7, 8 side and therefore the pressure in the passage system between the first and second change-over valve 30, 31 and the control valves 20, 21 is lowered. Thus, since at time T5 (before the first change-over valve 30 is opened) the difference between the pressure in the passage system and the pressure of the master cylinder 3 becomes reduced, it is possible to reduce the kickback and noises. Although in the above description the third change-over valve 32 and the motor 33 are respectively operated at T2 and T4, the operating timings are not limited thereto but can be changed appropriately.

Operation on the traction control will briefly be described hereinbelow. In this case, the non-driven wheel side braking pressure control system are not operated. When the decision that the driven wheels W3, W4 are approaching the excessive slipping states on vehicle acceleration is made on the basis of the signals from the wheel speed sensors 45 to 48, the electronic control unit 40 controls the first to third change-over valves 30 to 32 so as to take positions opposite to the positions thereof illustrated in FIG. 1 and stops the motor 33. As a result, the communication between the master cylinder 3 and wheel braking cylinders 7, 8 is cut off whereby the high-pressure braking liquid due to the pump 34 and the accumulator 36 is supplied through the second change-over valve 31 and the control valves 20, 21 to the wheel braking cylinders 7, 8 to cause the braking forces to be applied to the driven wheels W3, W4 so as to eliminate the excessive acceleration slipping of the driven wheels W3, W4.

When the electronic control unit 40 has decided that the acceleration slipping are removed in accordance with the decreases of speeds of the driven wheels W3, W4, the control valves 20, 21 are switched to take the pressure-decreasing mode and the braking liquid in the wheel braking cylinders 7, 8 are ejected toward through the third change-over valve 32 to the reservoir 4 whereby the liquid pressures in the wheel braking cylinders 7, 8 are lowered to cause the braking forces of the driven wheels W3, W4 to be reduced, resulting in preventing excessive lowering of the wheel speeds.

Furthermore, when the wheel speeds return to middle degrees, the electronic control unit 40 performs the control so that the control valves 20, 21 are switched to assume the pressure-maintaining mode so that the braking liquid in the wheel braking cylinders 7, 8 are kept there to maintain the braking pressures to constant values. Thereafter, if the driven wheels W3, W4 again approach the excessive slipping states, the electronic control unit 40 switches the control valves 20, 21 so as to take the pressure-increasing mode so that the high-pressure braking liquid is supplied from the accumulator 36 and pump 34 to the wheel braking cylinders 7, 8 to restrict increase of the slipping amounts of the driven wheels W3, W4.

With repeating the above-mentioned operations, the excessive slipping of the driven wheels W3, W4 are controllable, thereby resulting in ensuring the stability and acceleration characteristic of the motor vehicle. The pressure in the accumulator 36 is always monitored by means of the pressure switch 44 and in response to excessive lowering of the accumulator pressure the pump 34 is driven to increase the accumulator pressure so as to be regulated over a predetermined pressure value (for example, 10 MPa).

Operation on the anti-skid control will briefly be described hereinbelow. The electronic control unit 40 calculates the acceleration and deceleration values and slip ratios of the respective wheels W1 to W4 on the basis of the signals from the wheel speed sensors 45 to 48 and checks the locking states of the wheels on the basis of the calculation results and controls the control valves 10, 11, 20, 21 and the pumps 15, 25. When the braking pedal 1 of the motor vehicle is depressed by the vehicle driver, the pressures in the wheel braking cylinders 5 to 8 are increased so as to start the braking of the respective wheels W1 to W4, and in the case that, for example, deceleration values of the non-driven wheels W1, W2 are relatively great, the control valves 10, 11 are switched to assume the maintaining mode in order to keep the pressures in the wheel braking cylinders 5, 6 to constant value. Under this states, it is checked whether the non-driven wheels W1, W2 tend to be locked. If so, the control valves 10, 11 are switched to take the pressure-decreasing mode and the pump 15 is started, whereby the braking liquid in the wheel braking cylinders 5, 6 is escaped toward the damper 14 side to cause the pressures in the wheel braking cylinders 5, 6 are lowered, thereby returning the speeds of the non-driven wheels W1, W2. At the same time, the braking liquid in the damper 14 is returned by means of the pump 15 to the passage system between the master cylinder 3 and the control vavles 10, 11. Thereafter, the control valves 10, 11 are again switched to take the maintaining mode and under this states the slip ratios of the non-driven wheels W1, W2 are calculated. If the slip ratios are great, the control valves 10, 11 are switched to take the pressure-decreasing mode so as to reduce the braking forces for the non-driven wheels W1, W2. On the other hand, if the slip ratios are small, the control valves 10, 11 are switched to take the pressure-increasing mode to increase the braking forces. That is, the slip ratios are controlled to substantially assume appropriate values by the switching operations of the control valves 10, 11. In response to termination of the anti-skid control, the pump 15 is stopped and the control valves 10, 11 are returned to the pressure-increasing mode. Similarly, in the case that the driven wheels W3, W4 are in the locked states, the anti-skid control is performed for the driven wheels W3, W4.

Figure 5:
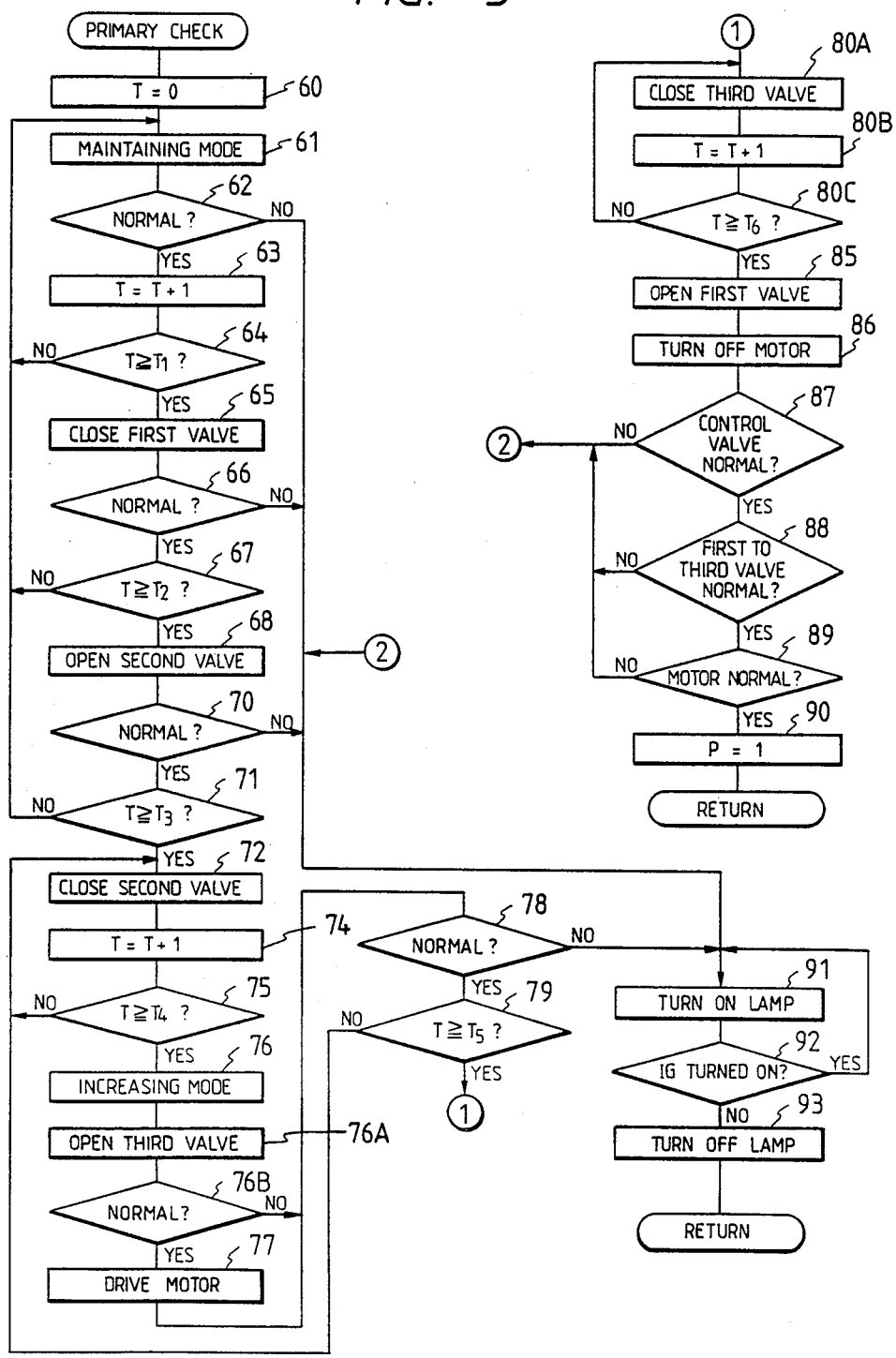
FIG. 5 is a flow chart for describing operation of braking control apparatus according to another embodiment of this invention.
Figure 6:
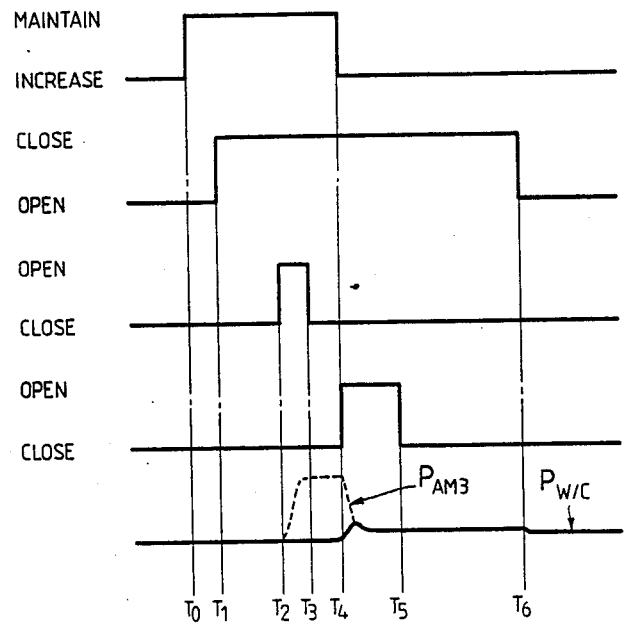
FIG. 6 is a timing chart for a better understanding of the FIG. 5 operation.

A second embodiment of the present invention whose mechanical arrangement is substantially same as that of the first-mentioned embodiment will be described hereinbelow with reference to FIGS. 5 and 6, FIG. 5 being a flow chart showing the processes made by an electronic control unit of a braking control apparatus according to the second embodiment and FIG. 6 being a timing chart for a better understanding of the primary check in the second embodiment. Parts in FIG. 5 corresponding to those in FIG. 3 showing the first embodiment are marked with the same numerals and the description thereof are omitted for brevity. In FIG. 5 in which the duty control operation of the first change-over valve 30 (T5 to T6) is omitted, after the execution of the pressure-increasing mode step 76, control goes to a step 76A to open the third change-over valve 32, followed by a step 76B in order to check whether the third change-over valve 32 is normal or not. If normal, control goes to the motor-starting step 77. Steps 80A, 80B and 80C are provided in order to close the third change-over valve 32, increment the first counter as T=T+1 and check whether the value T of the first counter becomes over a predetermined value T6. If so, control advances to the first change-over valve opening step 85.

The operating timings of the second embodiment will be described hereinbelow with reference to FIG. 6. In FIG. 6, at time T0, the control valves 20, 21 are operated so as to take the pressure-maintaining mode and at time T1 the first change-over valve 30 is closed and further at time T2 the second change-over valve 31 is opened. With these states, the valves are checked in terms of the normality. At this time, the pressure PAM3 in the passage system between the first and second change-over valves 30, 31 and the control valves 20, 21 once rises due to the high-pressure braking liquid in the accumulator 36. Thereafter, at time T3, the second change-over valve 31 is closed and the communication between the above-mentioned passage system and the accumulator 36 is cut off and at time T4 the control valves 20, 21 are returned to the pressure-increasing mode so that the high-pressure braking liquid in the passage system is supplied to the low-pressure wheel braking cylinders 7, 8, whereby the pressure PAM3 in the passage system is lowered so as to cause the wheel braking cylinder pressure Pw/c to be slightly increased. After elapse of a predetermined time from time T4, the first change-over valve 30 is opened, and therefore the pressure PAM3 in the passage system is lowered and the pressure difference with respect to the master cylinder 3 pressure is made small, resulting in reduction of the noises and kickback.

Thus, in the above-mentioned first and second embodiments, in order to reduce the kickback and noises on the primary check, it is preferred that the opening and closing operations of the respective valves are controlled in the following order.

First, the control valves 20, 21 are switched to be in the pressure-maintaining modes and and the first change-over valve 30 is closed, whereby the communication between the wheel braking cylinders 7, 8 and the passage system (between the first and second change-over valves 30, 31 and control valves 20, 21) is cut off and further the communication between the master cylinder 3 and the passage system is cut off. Secondly, the second change-over valve 31 is opened. At this time, the pressure in the accumulator 36 is supplied to only the passage system (the communication is cut off with respect to the master cylinder 3 and the wheel braking cylinders 7, 8). Thereafter, the pressure remains in the passage system irrespective of the closing of the second change-over valve 31. Therefore, the control valves 20, 21 are switched to be in the pressure-increasing modes so that the passage system is communicated with the wheel braking cylinders 7, 8 to reduce the pressure in the passage system. Finally, the first change-over valve 30 is opened to establish the communication between the passage system and the master cylinder 3. At this time, because the pressure in the passage system is already decreased, the great kickback to the braking pedal 1 can be reduced.

Here, let it be assumed that the above-mentioned order is changed, for example, if the second change-over valve 31 is opened with the control valves 20, 21 being in the pressure-increasing modes, the accumulator pressure is directly supplied to the wheel braking cylinders 7, 8 and therefore unnecessary braking operation occurs. Furthermore, if the second change-over valve 31 is opened with the first change-over valve 30 being opened, the accumulator pressure is directly supplied to the master cylinder 3, resulting in occurrances of noises and kickback to the braking pedal 1.

Figure 7:
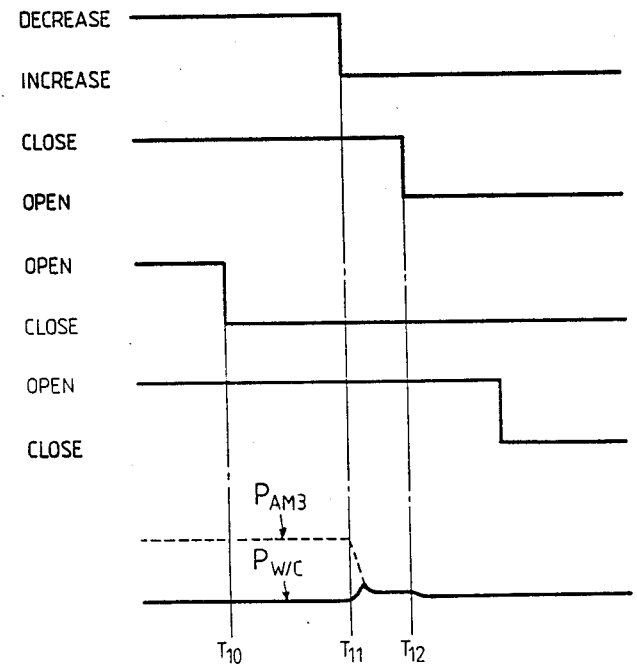
FIG. 7 is a timing chart for describing a modification of the embodiments of this invention.

FIG. 7 is a timing chart for describing operation made on termination of the traction control. In FIG. 7, during execution of the traction control (before time T10), the accumulator pressure is being supplied through the second change-over valve 31 and in response to termination of the control the second change-over valve 31 is closed at the time T10. The control valves 20, 21 are switched to take the pressure-increasing mode at time T11 and therefore the pressure PAM3 in the passage system is similarly lowered so that the kickback and noises are reduced when the first change-over valve 30 is opened at time T12.

It should be understood that the foregoing relates to only preferred embodiments of the present invention, and that it is intended to cover all changes and modifications of the embodiments of this invention herein used for the purposes of the disclosure, which do not constitute departures from the spirit and scope of the invention. For example, it is also appropriate to, instead of the control valves 10, 11, 20, 21, use control valves which are not arranged to take the pressure-maintaining mode. In this case, in the step 61 in FIG. 3, the pressure-maintaining may be changed to the pressure-decreasing. Here, generally, it is possible to change the pressure-maintaining in the step 61 to the pressure-decreasing even in the case of using the control valves which are arranged to take the pressure-maintaining mode. Furthermore, although in the above description the execution of the primary check is made under the condition that the motor vehicle is in the stopped state, it is also appropriate to perform the primary check under the other conditions such as the condition that the motor vehicle is running at an extremely low speed (for example, 3 Km/h).

What is claimed is:

1. A braking control apparatus for use in a motor vehicle having at least one wheel, comprising:

master cylinder means for generating a hydraulic pressure in response to a braking operation by a driver of said motor vehicle;

accumulator means for accumulating a hydraulic pressure;

wheel braking cylinder means for braking said wheel in accordance with a hydraulic pressure supplied thereinto;

passage means disposed in common between said wheel braking cylinder means and said master cylinder means or said accumulator means so that said wheel braking cylinder means is communicated through said passage means with said master cylinder means or said accumulator means;

cut-off valve means including first means provided between said master cylinder means and said passage means for controlling communication between said master cylinder means and said passage means and further including second means provided between said accumulator means and said passage means for controlling the communication between said accumulator means and said passage means, thereby allowing said first and second means to cut off the communication between said master cylinder means and said passage means in between said accumulator means and said passage means;

control valve means provided in said passage means for cutting off and establishing the communication between said passage means and said wheel braking cylinder means; and control means for checking the normality of operation of said cut-off valve means and said control valve means, said control means operating said control valve means so as to cut off the communication between said wheel braking cylinder means and said passage means, operating said cut-off valve means so as to cut off the communication between said master cylinder and said passage means and to establish the communication between said accumulator means and said passage means, operating said cut-off valve means so as to cut off the communication between said accumulator and said passage means and further between said master cylinder means and said passage means, operating said control valve means so as to establish the communication between said wheel braking cylinder and said passage means so as to reduce the pressure in said passage means after checking the normality of the valve means operation, and operating said cut-off valve means so as to establish the communication between said master cylinder and said passage means.

2. A braking control apparatus as claimed in claim 1, wherein said control means controls said cut-off valve means after communication between said master cylinder and said passage means so that the establishing and cutting operation of the communication between said master cylinder and said passage means is repeatedly performed plural times.

3. A braking control apparatus as claimed in claim 1, wherein said control means checks the stopping state of said motor vehicle and operates cut-off valve means and said control valve means under the condition that said motor vehicle is stopped.

4. A method of checking the normality of a brake system of a motor vehicle, said brake system including master cylinder means for generating a hydraulic pressure in response to a braking operation of a driver of said motor vehicle, accumulator means for accumulating a hydraulic pressure, wheel braking cylinder means for braking at least one wheel of said motor vehicle in accordance with a hydraulic pressure supplied thereinto, passage means disposed in common between said wheel braking cylinder means and said master cylinder means or said accumulator means so that said wheel braking cylinder means is communicated through said passage means with said master cylinder means or said accumulator means, control valve means provided in said passage means for cutting off and establishing the communication between said passage means and said wheel braking cylinder means, cut-off valve means including first means provided between said master cylinder means and said passage means for controlling communication between said master cylinder means and said passage means and further including second means provided between said accumulator means and said passage means for controlling the communication between said accumulator means and said passage means, thereby allowing said first and second means to cut off the communication between said master cylinder means and said passage means and between said accumulator means and said passage means, said method comprising the steps of:

operating said control valve means so as to cut off communication between said wheel braking cylinder means and said passage means;

operating said cut-off valve means so as to cut off communication between said master cylinder and said passage means;

operating the cut-off valve means so as to establish communication between said accumulator means and said passage means;

operating said cut-off valve means so as to cut off communication between said accumulator means and said passage means and further between said master cylinder means and said passage means;

operating said control valve means so as to establish communication between said wheel braking cylinder means and said passage means so as to reduce the pressure in said passage means after checking the normality of the valve means operation; and operating said cut-off valve means so as to establish communication between said master cylinder means and said passage means.

5. A method of checking the normality of a brake system of a motor vehicle, said brake system including master cylinder means for generating a hydraulic pressure in response to a braking operation of a driver of said motor vehicle, accumulator means for accumulating a hydraulic pressure, wheel braking means for braking at least one wheel of said motor vehicle in accordance with a hydraulic pressure supplied thereinto, passage means disposed in common between said wheel braking cylinder means and said master cylinder means of said accumulator means so that said wheel braking cylinder means is communicated through said passage means with said master cylinder means or said accumulator means, control valve means provided in said passage means for cutting off and establishing the communication between said passage means and said wheel braking cylinder means, first change-over valve means provided for cutting off and establishing the communication between said passage means and said master cylinder means, second change-over valve means provided for cutting off and establishing the communication between said passage means and said accumulator means, said method comprising the steps of:

operating said control valve means so as to cut off communication between said wheel braking cylinder means and said passage means;

operating said first change-over valve means so as to cut off communication between said master cylinder and said passage means;

operating said second change-over means so as to establish communication between said accumulator means and said passage means;

operating said second change-over valve means so as to cut off communication between said accumulator means and said passage means;

operating said control valve means so as to establish communication between said wheel braking cylinder means and said passage means so as to reduce the pressure in said passage means after checking the normality of the valve means operation; and operating said first change-over valve means so as to establish the communication between said master cylinder means and said passage means.

* * * * *